Nov. 24, 1925.
B. O. JENKINS
WATER MOTOR
Filed April 28, 1924
1,562,506
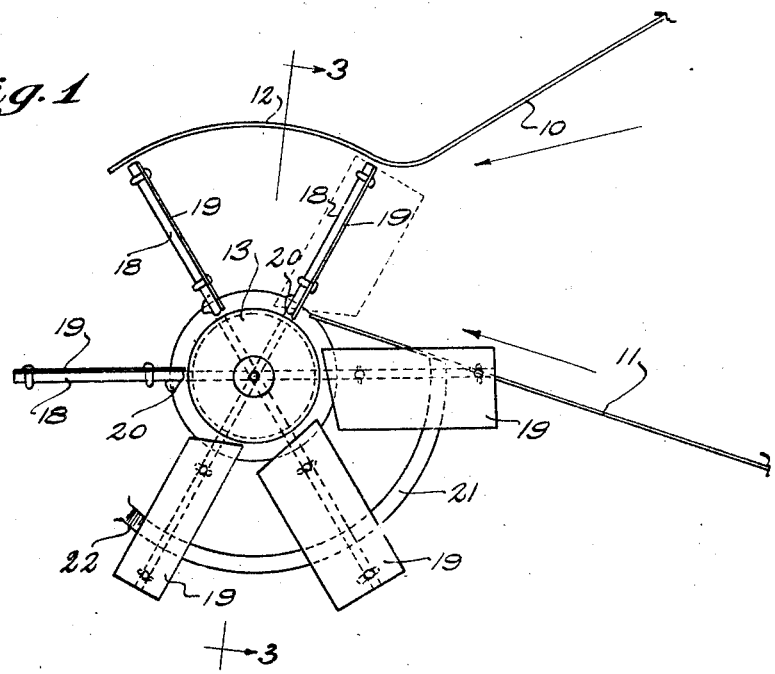
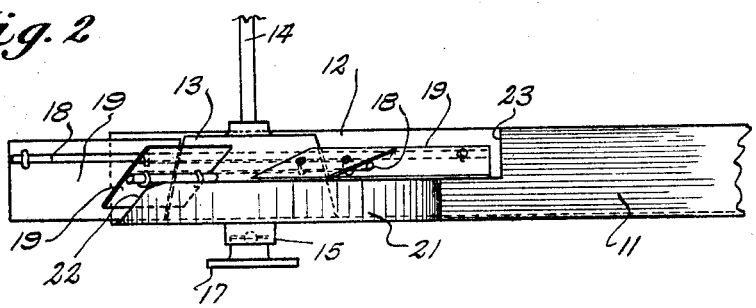
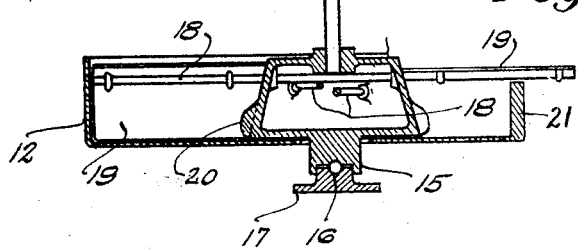
Inventor
BROOKS O. JENKINS.

Patented Nov. 24, 1925.

1,562,506

UNITED STATES PATENT OFFICE.

BROOKS O. JENKINS, OF BIRMINGHAM, ALABAMA, ASSIGNOR OF ONE-HALF TO A. H. STOCKMAR AND ONE-HALF TO ROBT. L. STEADHAM, BOTH OF BIRMINGHAM, ALABAMA.

WATER MOTOR.

Application filed April 28, 1924. Serial No. 709,674.

*To all whom it may concern:*

Be it known that I, BROOKS O. JENKINS, a citizen of the United States of America, residing at Birmingham, in the county of Jefferson and State of Alabama, have invented certain new and useful Improvements in Water Motors, of which the following is a specification.

My invention relates to an improvement in water motors and its objects are to design a motor which can be cheaply constructed and in which the stream of water is so conducted and directed against the moving blades that I am enabled to obtain the maximum efficiency from the motor and the maximum power per unit of flow of the current.

One object of my invention is to mount the blades so that their inner bevelled edges, in operating position, stand close to a hollow flaring drum which is given a considerable diameter so as to increase the leverage of the blades. In connection with this central drum support I provide a flume, the inner bulkhead of which is brought at a tangent to the edge of the drum so that the full force of the water is concentrated at a point well spaced from the axis of the power shaft and directed against each blade as it swings to operating position in the flume. To increase the efficiency of the motor, I prefer to mount the blades in pairs on opposite sides of the drum, each pair of blades being set at an angle of 90° to each other and rigidly connected to a common shaft which is free to turn in the drum.

My invention further comprises the details of construction and arrangement of parts, which in their preferred embodiments are hereinafter more particularly described and illustrated in the accompanying drawings, in which:—

Fig. 1 is a plan view of my improved motor and flume.

Fig. 2 is a side elevation of Fig. 1.

Fig. 3 is a vertical cross-sectional view on the line 3—3, Fig. 1.

Similar reference numerals refer to similar parts throughout the drawings.

According to my invention as illustrated, I provide a flume for the water to drive the water wheel by means of bulkheads 10 and 11, the bulkhead 10 having a curved portion 12 which is opposite to and concentric with a drum 13 having connected centrally to its upper head a vertical shaft 14 through which power is transmitted from the water wheel. The drum is in the form of a truncated cone of considerable diameter and its inner periphery is disposed so that the bulkhead 11 is substantially tangential to the side wall thereof opposite the bulkhead 12 so that the water in the flume is caused to flow directly and without any cross currents or eddies into the space between the drum and bulkhead 12. The drum 13 is provided with an inverted cup bearing member 15 which turns on an antifriction ball 16 mounted in a bearing plate 17 which is telescoped by the bearing member 15 on the drum. This arrangement is preferable as best adapted to protect the antifriction element from mud or dirt. The bearing 17 is made fast to any suitable foundation (not shown) in the bed of the stream. I connect to the drum 13 a series of paddle shafts 18, preferably three in number, which are passed diametrically through the drum and spaced equi-distantly and one slightly above the other so that they will clear each other where they intersect the center of the drum. The drum is provided with internal bosses or like devices to afford substantial bearing for the shafts 18. On each end of a shaft I mount a blade 19, which blades are made fast thereon by rivets or other suitable fastenings and are disposed at an angle of 90° to each other. The inner edges of the blades are bevelled to conform to the taper of the drum. The drum near the bottom thereof is provided with a series of lugs 20 which project a short distance from the drum and which are arranged so that one of these lugs serves to engage the lower inner corner of a blade when the latter swings down into vertical operating position in the flume. On the rear side of the bulkhead 11 I provide a guide 21 which is curved and provided at one end with an inclined surface 22 while at the other end it abuts the bulkhead 11 at a point opposite a notch 23 therein.

In operation, as each blade 19 swings so that its inner edge clears the bulkhead 11, it drops down from horizontal to vertical position and takes the full thrust of the stream of water flowing through the flume and such thrust is imparted from the drum to the shaft 14. The swinging movement of the blade in the flume to vertical position serves to turn the free blade to horizontal position so that it will ride over the guide 21 and through the notch 23 and by the time it is ready to drop into vertical and operating position, the blade of the other end of its shaft has moved clear of the driving stream of water and is free to be swung up to horizontal position.

By the use of the tangential arrangement of the bulkhead 11, with bevelled blades, I cause the blades to drop down more quickly into the flume as the bevelled inner edge of the blade will permit it to drop from the bulkhead 11 at an earlier position than would be the case if the blade's inner edge were squared off. By this means I am enabled to drop one blade into position to be acted upon by the water deflected by the bulkhead 11 while the pressure of the direct flowing water along the bulkhead 10 is still maintained on the preceding blade. This is indicated by the arrows in Fig. 1 and gives me the maximum utilization of the concentrated flow in the flume.

The utilization of the drum of large diameter is the most important feature as it makes possible the concentrating of the stream of water upon the blades while maintaining them sufficiently spaced from the center of the drive shaft to give them a considerable leverage.

This application is a refiling of the former application Serial 865,536, filed October 13, 1914, and which has been abandoned.

Having thus described my invention, what I claim as new and desire to secure by Letters Patent, is:—

In a water motor, a power shaft, a frusto conical drum connected to said shaft and disposed with its smaller end uppermost, a plurality of transverse horizontal axes passed through the drum, blades rigidly mounted on the ends of said shafts and having their inner edges bevelled to correspond with the angle of the drum's wall, the blades on the ends of each shaft being set at right angles to each other, a flume having at one side a diagonal wall tangential to the drum which extends substantially from top to bottom of the flume, means to guide the idle blades over the diagonal wall of said flume, their bevelled edges permitting them to more quickly clear said flume wall, and means to arrest the blades in vertical position as they swing down under pressure of the water in said flume, said blades when under water pressure being disposed with their inner edges close to the periphery of the drum.

In testimony whereof I affix my signature.

BROOKS O. JENKINS.